(12) United States Patent
O'Hare

(10) Patent No.: US 6,886,726 B1
(45) Date of Patent: May 3, 2005

(54) SPORTSMEN'S GEAR CARRIERS

(76) Inventor: Daniel P. O'Hare, 1 Princeton Ave., Fort Mitchell, KY (US) 41017

( * ) Notice: Subject to any disclaimer, the term of this patent is extended or adjusted under 35 U.S.C. 154(b) by 153 days.

(21) Appl. No.: 10/350,612

(22) Filed: Jan. 24, 2003

Related U.S. Application Data
(60) Provisional application No. 60/351,918, filed on Jan. 25, 2002.

(51) Int. Cl.$^7$ ............................................... A45C 15/00
(52) U.S. Cl. ...................... 224/576; 224/602; 224/625
(58) Field of Search ................................. 224/576, 155, 224/600, 602, 603, 625, 626

(56) References Cited

U.S. PATENT DOCUMENTS

| | | | | |
|---|---|---|---|---|
| 5,265,782 A | * | 11/1993 | McNamara | ....................... 2/94 |
| 6,035,450 A | * | 3/2000 | Monsen et al. | ................. 2/422 |
| 6,135,333 A | * | 10/2000 | Tucker et al. | ................ 224/646 |
| 6,155,471 A | * | 12/2000 | Lichtenberger | .............. 224/626 |
| 6,267,276 B1 | * | 7/2001 | Cook | .......................... 224/183 |
| 6,311,336 B1 | * | 11/2001 | Gootrad | .......................... 2/251 |
| 6,443,347 B1 | * | 9/2002 | Elizalde et al. | .............. 224/626 |
| 6,547,110 B2 | * | 4/2003 | O'Hare | ........................ 224/155 |
| 6,644,527 B1 | * | 11/2003 | Karenga | ...................... 224/602 |

* cited by examiner

*Primary Examiner*—Stephen K. Cronin
(74) *Attorney, Agent, or Firm*—Wood, Herron & Evans LLP

(57) ABSTRACT

Gear carriers for sportsmen such as hunters, shooters and fly fishermen are provided in single shoulder mounted, cross-chest configuration with gear pockets, receptacles and other carrying elements oriented thereon, rendering each carrier ambidextrous and providing even load distribution for each of the carriers specific to a particular sporting function.

Each carrier embodiment is ergonomically configured to facilitate use and gear access by the user participating in a particular sport for which the carrier is particularly suited.

69 Claims, 12 Drawing Sheets

SPORTSMEN'S GEAR CARRIERS

Benefit of the filing date of Jan. 25, 2002 of U.S. provisional patent application Ser. No. 60/351,918 is herewith claimed. Said United States provisional patent application is herewith expressly incorporated herein by reference in its entirety.

FIELD OF THE INVENTION

This invention relates to accessories and aids for sportsmen and more particularly to body-worn gear carriers.

BACKGROUND OF THE INVENTION

Over the years, many variations of satchels, backpacks, fanny packs, vests and the like have been adapted to uses by sportsmen, such as hunters and fishermen, for carrying their respective gear. One prior form of carrier for waterfowlers includes a cross-chest satchel worn over one shoulder and having a side pocket hanging beneath the opposite shoulder when worn by a waterfowl hunter. Identical goose or duck call pockets are disposed on the opposite sides of the satchel located over the chest and back when worn. This rendered the satchel ambidextrous. Elastic shell loops were provided over the side gear pocket.

While this device satisfied the needs of waterfowlers, it was not suitable for other sportsmen, such as hunters and fishermen, including deer hunters, turkey hunters, upland game hunters, skeet shooters, trap shooters, sporting clay shooters and fly fishermen. Each of these groups of sportsmen have particular needs for holding, carrying or storing different gear particular to their focused endeavors, and for having that gear readily and ergonomically accessible (or useful deployment in field or fishing environments.

In addition, it is necessary for hunters such as turkey hunters and deer hunters in gun season to display hunter orange on themselves to distinguish them from game or other targets in the field and thus enhance their safety.

Moreover, whatever gear is to be carried, it is desirable to disperse it ergonomically so its weight is evenly distributed on the body of a user of the carrier.

When a typical hunting vest is loaded with gear, the load pulls the front of the vest down. This puts pressure on the back, causing back pain and discomfort. In addition, such vests are not widely adjustable as to size or to clothing worn and a single vest does not efficiently satisfy the needs of a single hunter, much less being adaptable to a variety of hunters whose size, weight and clothing may vary greatly. Moreover, the prior devices do not provide the function of providing gear receptacles so that when loaded for the specific endeavors or type of hunting, the resulting load is evenly distributed.

Also, when a typical vest is loaded, the items in the vest tend to obstruct the gun mount in preparation for a wing shot. Thus, if a vest stores any calls in a position where they need not be disconnected from a typical neck-worn lanyard, they can interfere with a gun mount.

Backpacks used in hunting or shooting situations present similar problems. When carrying gear, they stress back or stomach muscles; the load is not evenly distributed on the body. Moreover, backpacks and fanny packs must be generally removed or rotated to gain access, both causing game distracting movement.

While it is known to provide various hunters' satchels, shell bags and game bags which have a strap fitting over the head of the user and resting on one shoulder while the bag rests on the hunter's other side, such devices tend to bite into the support shoulder and do not have particular receptacles for the specific variety of waterfowl hunting accessories used by a hunter. Moreover, while such bags may be transferred from one shoulder to the other, they do not provide ready access to the hunter for his particular gear or the like, regardless of whether he is right or left-handed, and they will not easily accommodate the needs of both right and left-handed hunters when worn during a shooting or fishing activity.

Accordingly, the prior all does not adequately or universally satisfy the needs of deer, turkey or upland game hunters, nor the specific needs of skeet, trap and sporting clay shooters or fly fishermen.

Accordingly, it has been one objective of this invention to provide improved gear carriers for sportsmen in particular fields of endeavor where their respective gear is adequately stored with even load distribution for carrying in the Field or stream, yet is particularly readily and ergonomically accessible.

A further objective of the invention in one embodiment has been to provide an improved gear carrier particularly suitable for deer and big game hunters.

A further objective of the invention in another embodiment has been to provide an improved gear carrier particularly suitable for turkey hunters.

A further objective of the invention in another embodiment has been to provide an improved gear carrier particularly suitable for upland game hunters.

A further objective of the invention in another embodiment has been to provide an improved gear carrier particularly suitable for users participating in the shooting sports, such as skeet, trap and sporting clays.

A further objective of the invention in another embodiment has been to provide an improved gear carrier particularly suitable for fly fishermen.

SUMMARY OF THE INVENTION

To these ends, the invention in its various embodiments contemplates a cross-chest, ambidextrous, adjustable gear carrier in combination with the particular elements and features defined in detail herein which have been discovered to satisfy the particular needs of particular groups of sportsmen, and which solve the gear carrying and gear accessibility problems which have been faced by such sportsmen over the years when dealing with prior gear carriers which have not answered these sportsmen's needs. Each embodiment represents a unique combination of elements and features combined with benefits of a cross-chest worn, ambidextrous, adjustable gear carrier which renders it particularly suitable for the focused endeavors of each respective group of sportsmen described herein. Specific gear loads are evenly distributed via particularly configured and positioned gear pockets. In accordance with the invention, each embodiment provides a carrier which ergonomically suits the user with respect both to load distribution and to ready access to the particular gear necessary to be readily at hand.

In particular, each embodiment provides a gear carrier with features and elements which have been discovered to provide particularly ergonomic access to specific gear required in specific field, shooting or fly fishing environments, all while evenly distributing a gear load across a user's shoulder, chest and back and while leaving a selected shoulder free to perform the necessary activities of the sport.

Other advantages, modifications and embodiments of the invention will be readily appreciated from the following detailed description and from the drawings in which:

DETAILED DESCRIPTION OF THE INVENTION

Turning now to the drawings, it will first be appreciated that each of the carrier embodiments described herein has the advantage and attributes of a cross-chest worn, ambidextrous, adjustable fit carrier, evenly distributing the load of the particular gear for which it is uniquely configured. Each embodiment also includes specific and unique features which not only distinguish it from the others, but which contemplates the particular needs of a particular group of sportsmen as discovered and defined herein, and provides unique features which particularly and ergonomically suit each user, right or left-handed and within a wide range of user sizes, shapes and clothing.

It will thus be appreciated that each embodiment includes two over-the shoulder panels defining, when adjusted and attached together, a single over-the-shoulder strap for the carrier and descending into respective ends of a side panel. When worn, each embodiment has one over-the-shoulder panel descending from a first shoulder of the user across the chest of a user and the other over-the-shoulder panel descending from the same shoulder across the back of the user, both descending into the side panel at its respective ends with the side panel oriented at the side of a wearer opposite said shoulder and under his other or second shoulder.

In each embodiment, the carrier can be reversed so the over-the-shoulder strap is worn on the second shoulder with the side panel disposed under the first shoulder, rendering the carrier, in combination with its specific gear carrying features for each embodiment, uniquely suitable for a user of that embodiment, whether he is right or left-handed, while still evenly distributing a gear load and while retaining the ergonomic circumstances and access to specific gear of each wearer. The carriers are thus easily worn over the right or left shoulder to provide freedom of movement of the off side shoulder or arm, to clear a shoulder for a gun mount, to present a recoil pad to absorb recoil from a gun stock; or to free a shoulder or arm for casting a fly rod or the like.

Adjustment of the attachment of the over-the-shoulder panels to each other accommodates a wide variety of user sizes, shapes and various forms of clothing worn under the carrier for that particular user group.

It will be appreciated in the following description, for brevity, like parts on each embodiment may be referred to by the same numbers.

Figure 1:
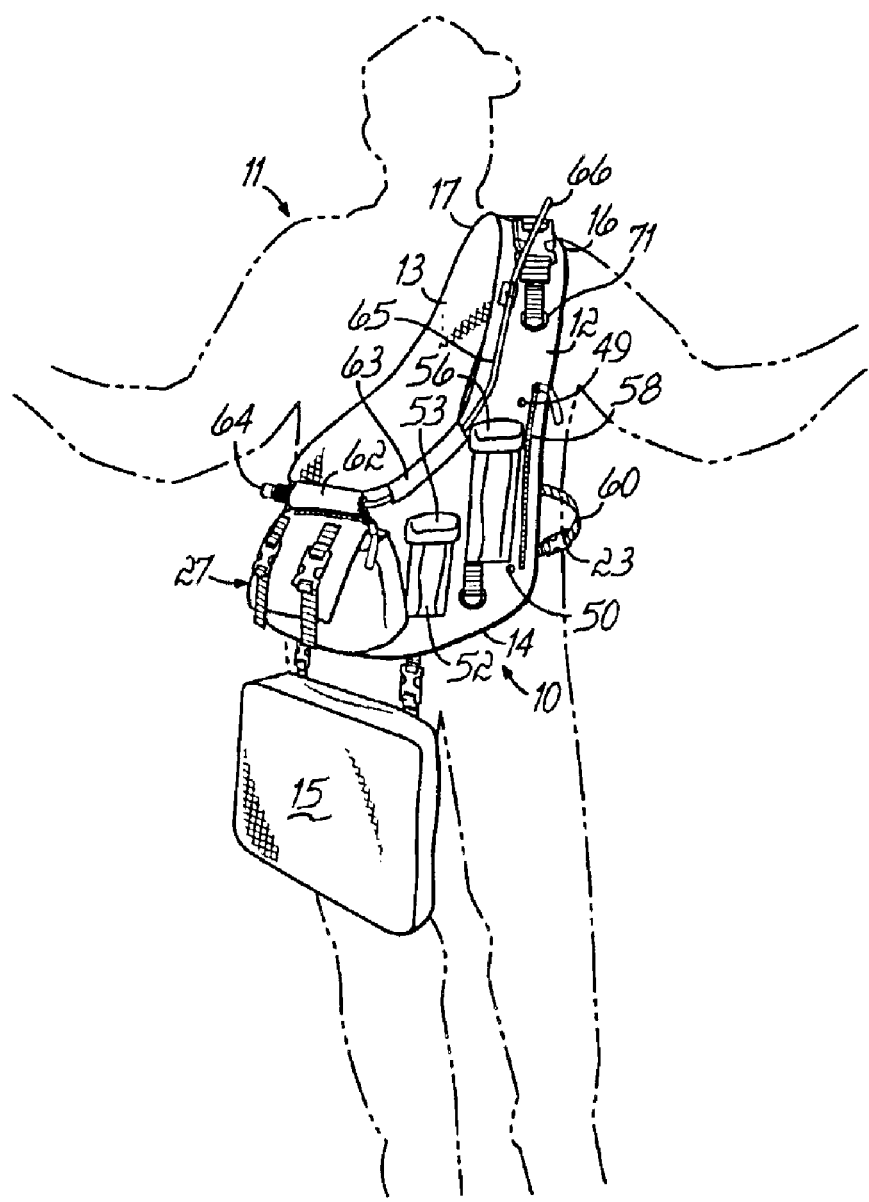
FIG. 1 is a perspective view of a deer hunter's gear carrier according to the invention shown being worn by a user.
Figure 2:
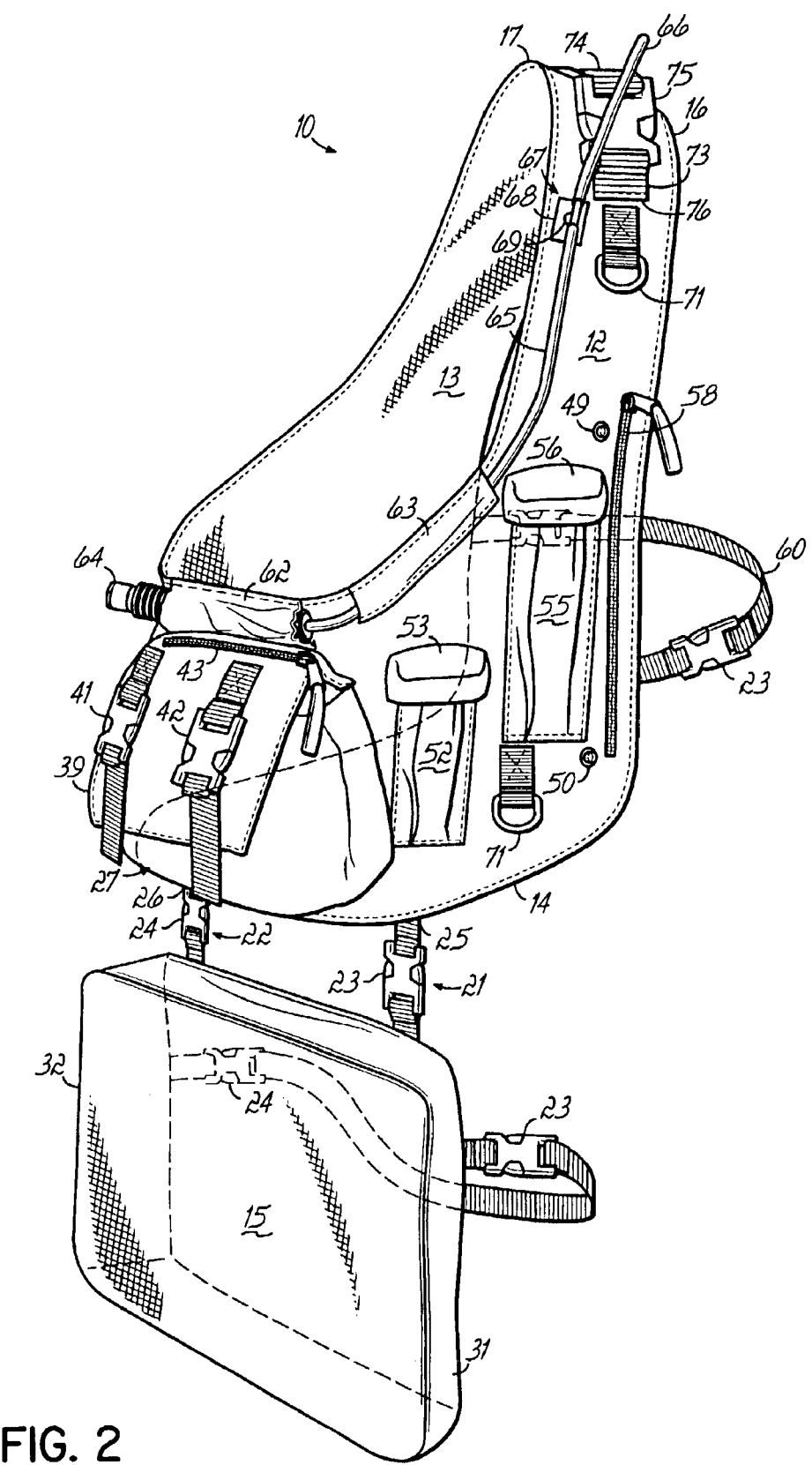
FIG. 2 is a perspective view of the carrier of FIG. 1.
Figure 3:
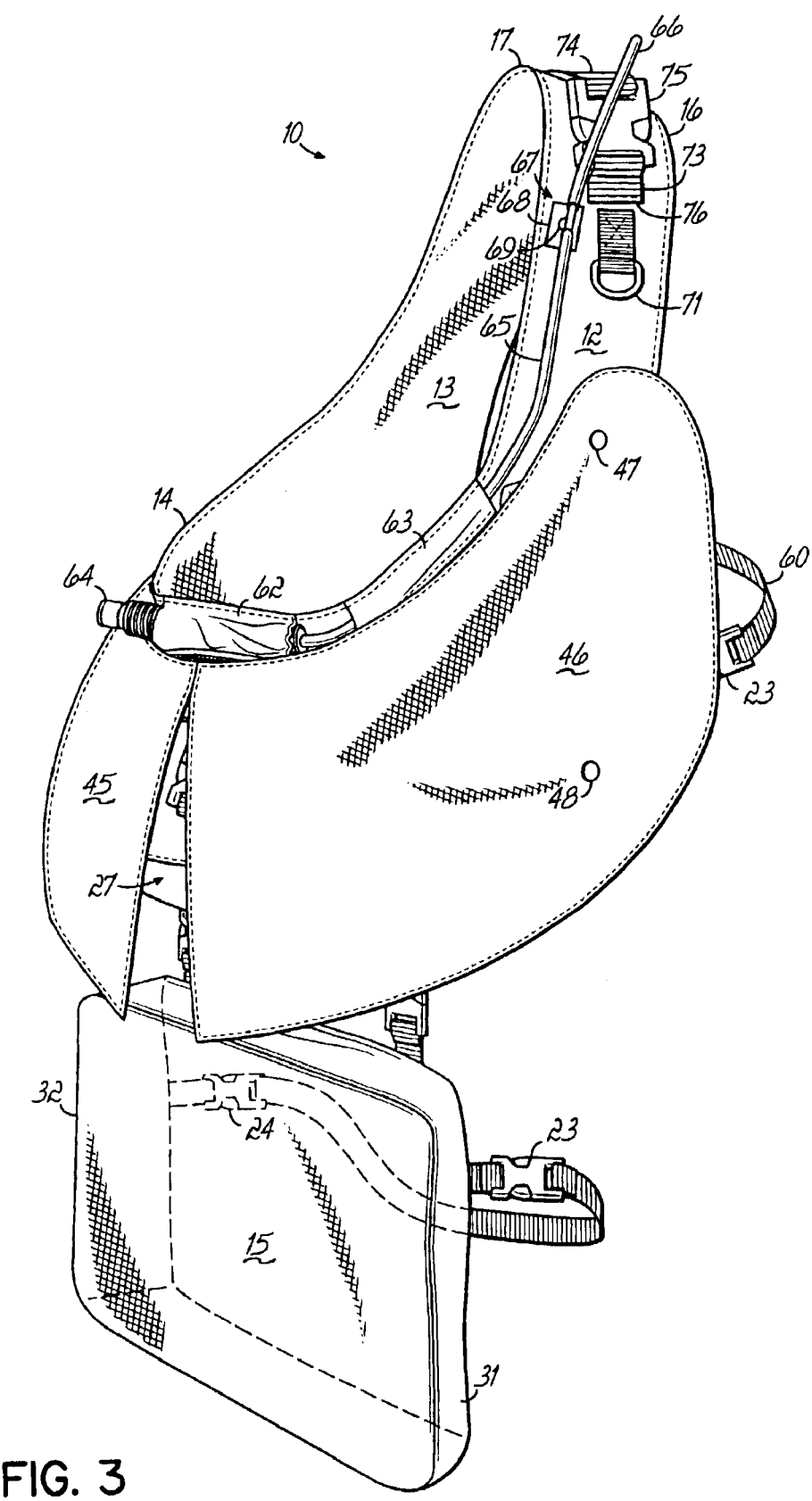
FIG. 3 is a perspective view of the carrier of FIG. 2A but showing the hunter's orange signal panel deployed.

Referring to FIGS. 1–3, there is shown therein a gear carrier 10 particularly configured for use by a deer hunter 11 (shown in phantom in FIG. 1). Carrier 10 includes 2 over-the-shoulder panels 12 and 13, defining and over-the-shoulder strap, and a side panel 14. A releasably attached seat pad 15 is secured to the side panel 14 as will be described.

Panels 12 and 13 extend upwardly from respective ends of side panel 14 and the panels 12, 13 and 14 may be integrally formed of multiple layers or any suitable material.

At upper ends 16, 17, of the over-the-shoulder panels 12, 13, there are provided complimentary hook 18 and loop 19 fastener components of any suitable form. Preferably, the loop component 19 is disposed on an outer surface of upper end 17 of panel 13 and the hook component 18 as an inner surface of the upper end 16 of panel 12 which overlaps end 17. The hook and loop fastener provides an adjustable attachment of panels 12 and 13 accommodating varied sizes, shapes and clothing of hunter 11.

Adjustable straps 73 and 74 are secured to complimentary components of a quick connect buckle 75, of any suitable well-known type. One end of strap 73 is secured to panel 12 and extends out through slot 76 (not shown) to a component of buckle 75. The free end of strap 73 is tucked into panel 12 through slot 76. Likewise, strap 74 is secured to panel 13 and extends outwardly through a like slot 76 to a complimentary component of buckle 75. A free end of strap 74 is tucked likewise into slot 76 on panel 13.

Once a user adjusts the relative position of the upper ends of panels 12, 13 to his size, shape and clothing, he secures buckle 75 with straps 73, 74 adjusted at the buckle 75 to secure the end of panels 12, 13 in place, and provides additional positioned security to the hook and loop fastener 18, 19 also holding the panel ends 16, 17. The loop component 19 is on the outer side of panel 13 and the hook component 18 on the inner side of panel 12 so the hook component does not grab the straps 73, 74.

Pad 15 is secured to a lower edge of side panel 14 by a pair of flexible straps 21, 22, each with a male or female component of a quick release buckle or connector 23, 24 of any suitable type. The straps are adjustable to adjust the vertical position of pad 15. The pad 15 is secured at two points 25, 26 disposed at a lower edge of side panel 14 beneath opposite sides of side gear pocket 27.

A strap 29 is releasably secured to opposite edges 31, 32 of pad 15 by similar quick release buckles as 23, 24. Strap 29 can be wrapped around the leg of a user to secure the pad against too much movement while walking. It can also be used to secure pad 15 to a support such as a tree, tree stand, post or other structure to be used as a backpad.

Figure 2A:
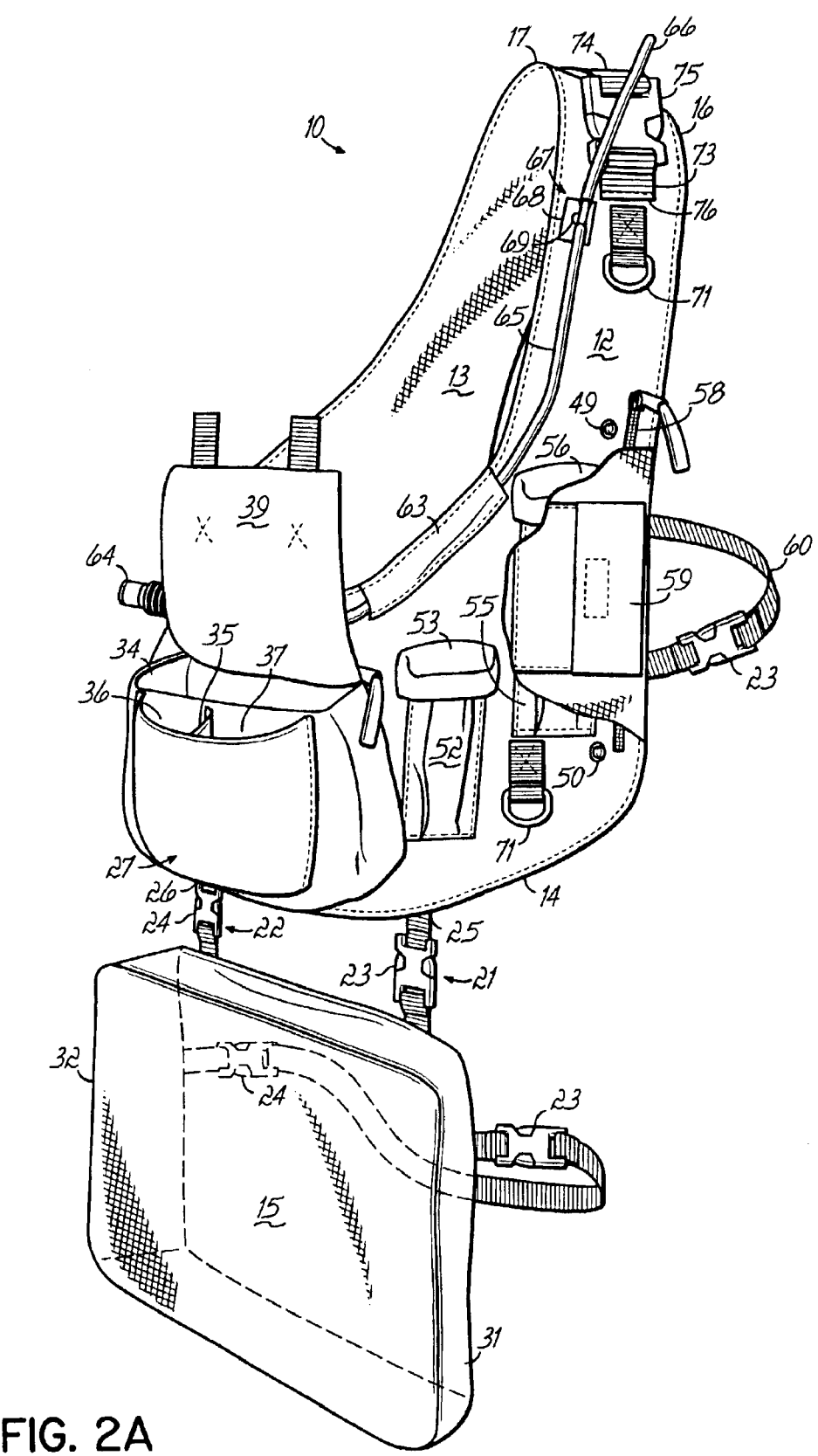
FIG. 2A is a perspective view of the carrier of FIG. 2 showing an open side gear pocket.

In use, pad 15 can be pivoted under a user 11 from the side, or buckle 23 is released, allowing pad 15 to be pivoted under a user 11 from the backside. Side gear pocket 27 is best seen in FIG. 2A. It comprises an inner pocket 34, with an outer pocket thereon divided by a panel 35 into open top outer pockets 36, 37. This pocket is particularly suited for larger or heavier items such as binoculars, extra ammunition, food or the like.

Flap 39 is hinged to side panel 14 (over side gear pocket 27 and is held by straps secured by quick buckles 41, 42 as shown.

Flap 39 itself comprises a pocket closed by zipper 43. Stored within flap 39 is a two-component hunter's orange colored signal panel 45, 46, shown deployed from flap 39 in FIG. 3.

Each panel has two snap components 47, 48 cooperating with snap components 49, 50 an panel 12 and 14, respectively, to hold panel 46 across the body of a user 11. Panel 45 has two similar snap components (not shown) cooperating with snap components on panel 13 and panel 14 (not shown) for holding panel 45 in a similarly deployed position. When the panels are deployed on a right handed user 11, for example, panel 45 will cover the back of the user 11 and panel 46 will cover his chest. When stored, the panels are secured in flap 39, closed by zipper 43.

An elongated flashlight pocket 52 is disposed on panel 14 proximate each side of side gear pocket 27, (not shown on the opposite side). Each is covered by a flap 53.

An elongated deer call or grunt tube pocket 55 is disposed proximate each end of panel 14 and each pocket 55 extends upwardly toward a respective panel 12, 13. The pocket 55 extending up onto panel 13 is not shown in FIG. 2A. Each pocket 55 is covered by a closure flap 56.

A zipper closure 58 is disposed in a front layer of panel 12 proximate its edge, providing access into panel 12. It will be appreciated that each panel 12, 13 and 14 are comprised of external and internal layers so a large pocket area is formed within each panel, accessible by zipper closure 58 for gear storage. Another zipper 58 is disposed in a mirror-image position oil panel 13 to provide similar access into panels 13, 14.

Interior pockets 59 are disposed in panels 12, 13 just inside zipper 58 and on the inner surface of the interior layers making up panels 12, 13 for storage of such tangible items as drivers and hunting licenses, cash and the like.

An adjustable waist belt 60 is secured to ends to side panel 14 to secure the carrier 10 about the waist of a user 11. Two buckles 23 (not shown) secure belt 60. Belt 60 is provided at its ends with like components (male or female) of buckles 23 and the carrier 10 with opposite components (female or male) so belt 60 can easily be attached by right or left-handed users.

A significant feature of carrier 10 is a means to secure a hands free, deer call grunt tube to the carrier. This includes a grunt tube pocket 62 disposed in panel 14 over side gear pocket 27, and a flexible tube directing sleeve 63 operatively disposed at an end of pocket 62. In use, a grunt call or tube 64 is secured in pocket 62 by elastic gathered ends thereof. A flexible tube 65 extends from call 64 in pocket 62 through sleeve 63 and upwardly along panel 12. An end 66 of tube 65 is positioned at a location near the mouth of a user 11. Without significant movement, the user 11 can suck on tube end 66 to cause call 64 to produce a deer calling sound or grunt, useful to call or to stop a deer.

The upper section of tube 65 near end 66 is held by a swivel connector 67 comprising a socket plate 68 and a ball 69 connected to tube 65. Plate 68 is pinned to panel 12 μl a suitable position for the wearer and the tube is adjusted through the pivoting of the swivel to an approximate position near the mouth of a user. Any suitable fastener can be used to position the upper end of tube 65.

Likewise, another identical sleeve 63 (not shown) is also positioned on the other side of pocket 62 so the call can be reversed, with the tube 65 extending upwardly along panel 13 for a left-handed user. Ally suitable grunt tube can be used. However, one such suitable grunt tube 64 is that produced by A-way Hunting Products of Beaverton, Mich., Model "BOWGRUNTER PLUS" hands free grunt call.

Appropriate "D"-rings 71 are attached to carrier 10 as shown both to panels 14 and 12 as shown, and on the opposite side to panel 13 in mirror-image position (not shown).

It will be appreciated that carrier 10 is ambidextrous. That is pockets 52, 55, zippers 58, "D"-rings 71 and snaps 49, 50 are duplicated in their respective mirror-image positions on the vest so that when reversed and placed over the right shoulder of a left-handed user, that user has the same carrier features presented to him in the same way as a right-handed user 11.

Moreover, it will be appreciated that when worn, carrier 10 is oriented on a user such that side panel 14 rests on his hip area at one side while panels 12, 13 traverse his chest and back and hang from his opposite shoulder. This provides a weight distribution on the body of a user which does not tend to pull a user backwardly or forwardly, but tends to evenly distribute the weight of the specific gear carried in a way that is not as tiring or stressful. At the same time, the features or elements of the carrier 10 as discussed in combinations provide ready access, ergonomically suitable to the particular gear required by a user 11, whether right or left-handed, of a variety of sizes and shapes and over a variety of clothes worn through the adjustments of panels 12, 13, belt 60, and pad 15. These general characteristics are similar for each of the embodiments described herein, although each has specifically different combinations of features for a particular use.

The carrier of this embodiment is best worn over the left shoulder of a right-handed user or the right shoulder of a left-handed user. This leaves the appropriate shoulder area free of obstruction for the mounting of a gun.

Figure 4:
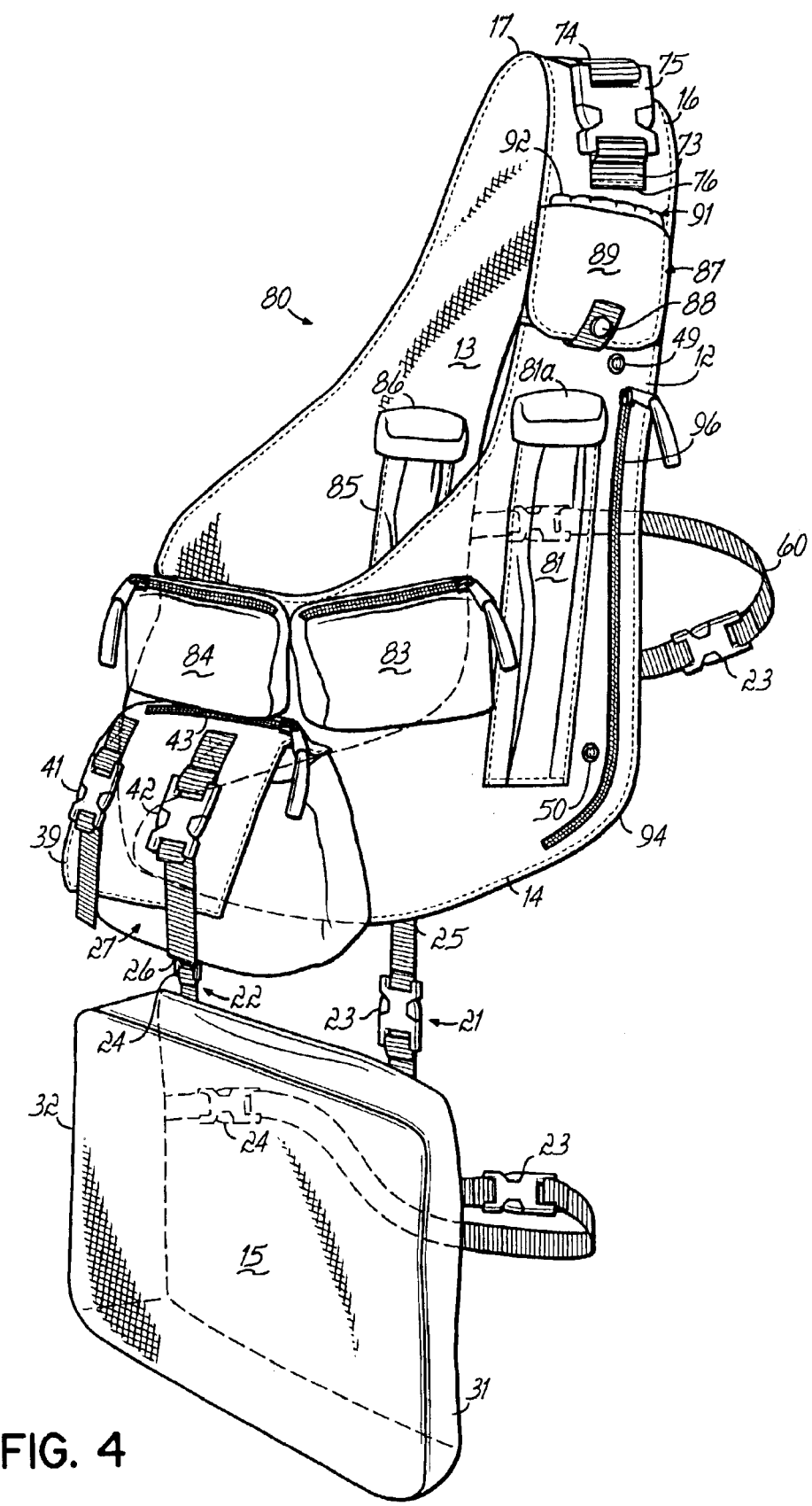
FIG. 4 is a perspective view of a turkey hunter's gear carrier according to the invention.
Figure 4A:
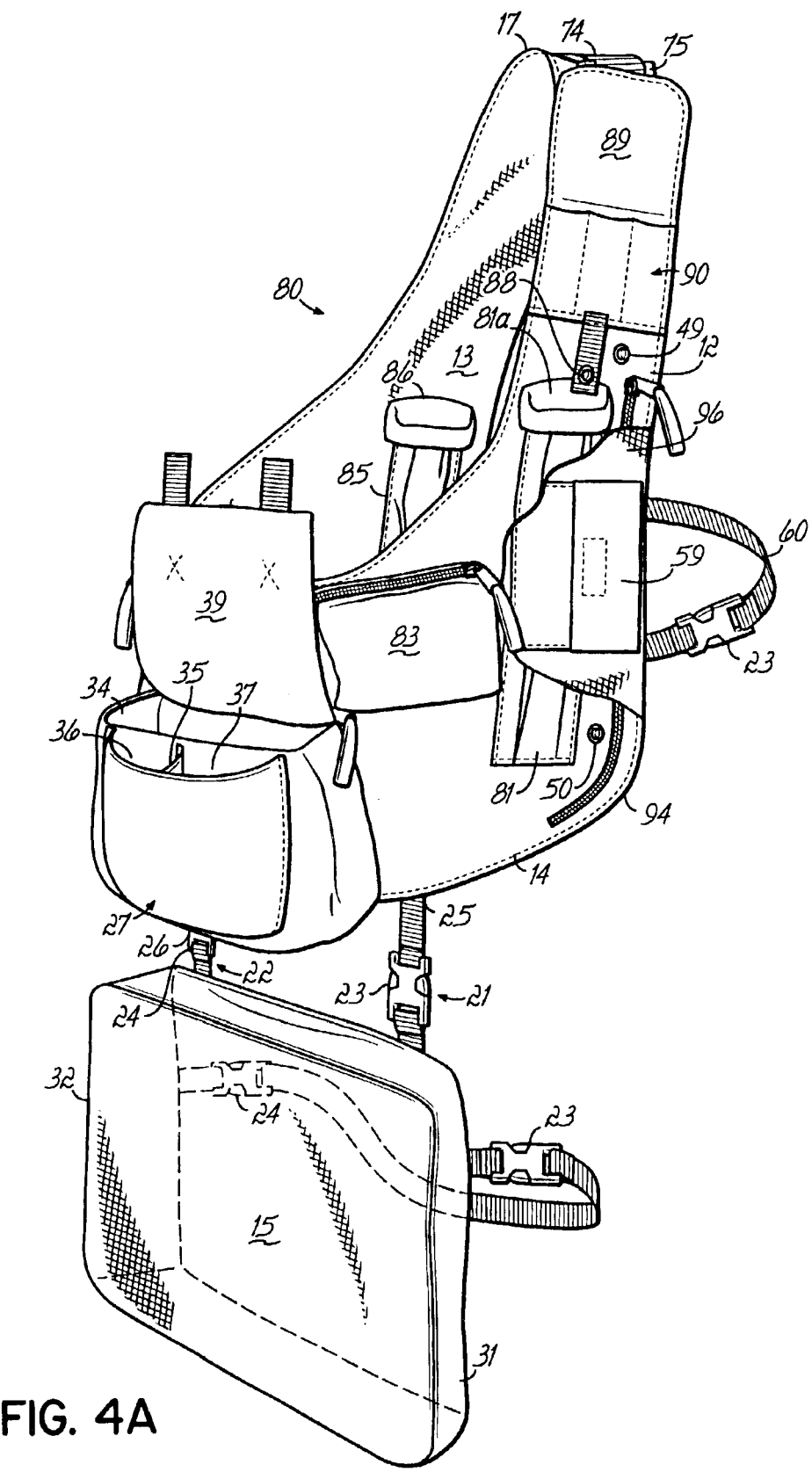
FIG. 4A is a perspective view of the carrier of FIG. 4 but showing an open side gear pocket.
Figure 5:
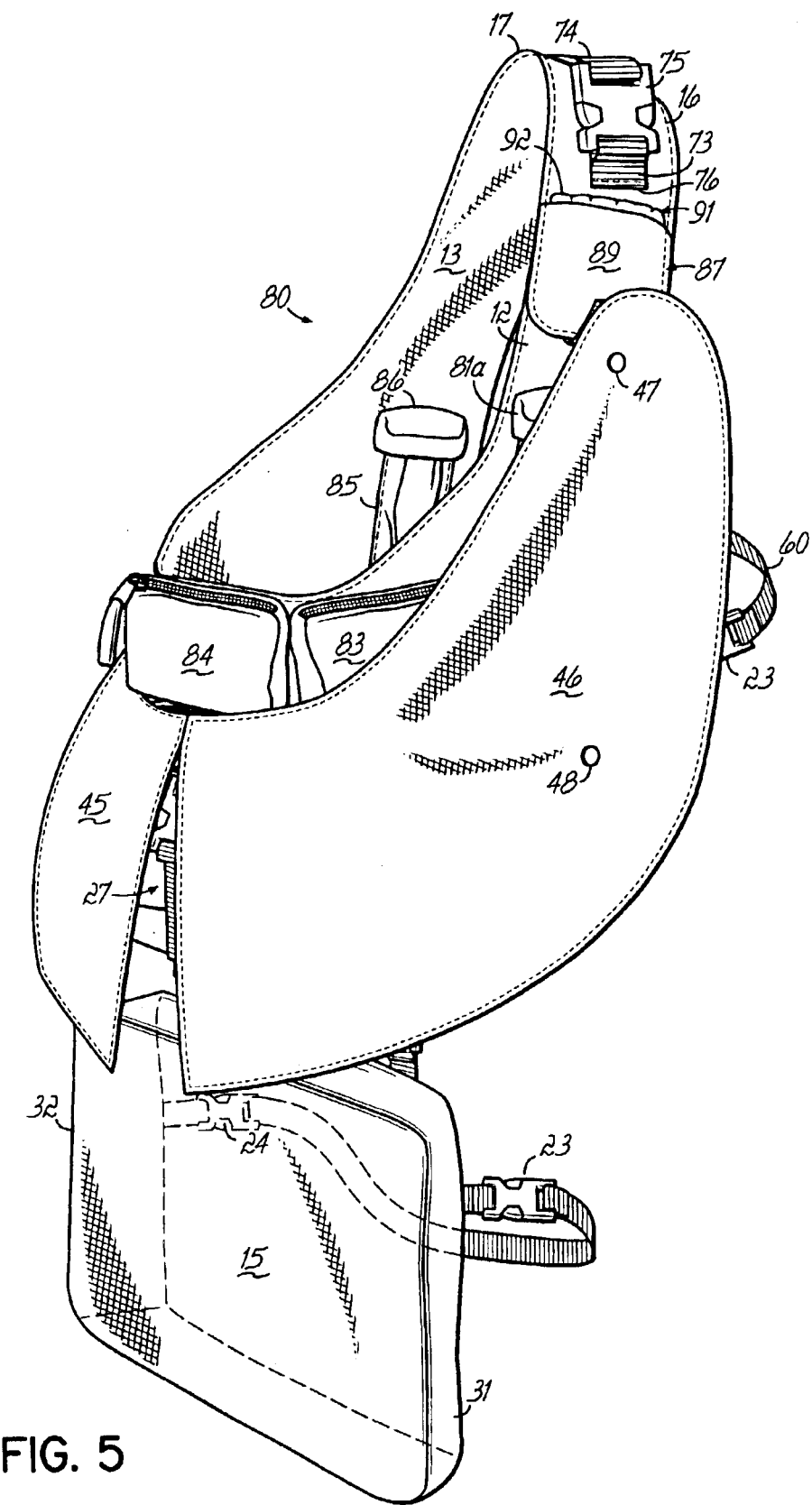
FIG. 5 is a perspective view of the carrier of FIG. 4A but showing the hunter's orange signal panel deployed.

FIGS. 4–5 depict a carrier 80 configured for particular use by a user such as a turkey hunter (not shown). Elements of this carrier 80 similar to or like those of carrier 10 will bear the same numbers as FIGS. 1–3 and will not be further described herein; they operate similarly and provide similar advantages and benefits to a user as those of FIGS. 1–3.

Figure 2B:
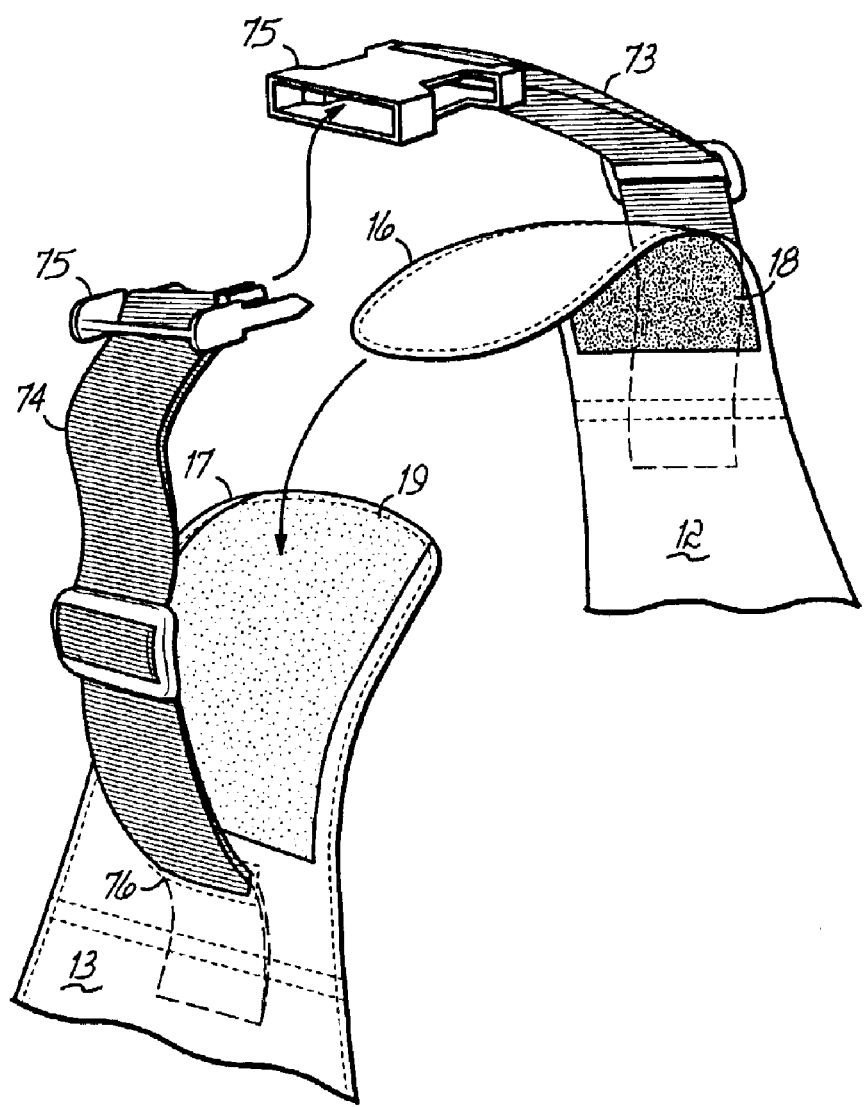
FIG. 2B is a perspective view illustrating the adjustable interconnection of panels on various embodiments.

Carrier 80 includes numerous features similar to those of carrier 10. These include panels 12, 13, 14, page 15, straps 21, 22, side gear pocket 27, outer pockets 36, 37, divider 35, flap 39, panels 45, 46, snaps 47, 48, 49, 50, interior pockets 59, straps 73, 74, buckle 75 and hook and loop fastening components 18, 19 (FIG. 2B) on upper ends of panels 12, 13 as described above.

Carrier 80 comprises additional features rendering the carrier 80 particularly useful to turkey hunters. An elongated turkey box call pocket 81 extends from one end of side panel 14 well up into a central area of over-the shoulder panel 12 and is of such length and width as to accommodate an elongated turkey box call. Flap 81A provides protection and security for the box call, or the pocket may have an open but elastically gathered mouth.

Carrier 80 also includes two gear pockets 83, 84. (FIG. 4); and a third gear pocket on the other side, not shown in the Figs, but is of similar size, shape and orientation on panel 14 as pocket 83 on the side shown. Pocket 83 and the non-shown pocket toward the other end of panel 14 near panel 13 are each oriented so they are, at their ends nearest respective panels 12, 13, angled upwardly when worn to accommodate and render readily and ergonomically accessible turkey calls, such as slate calls, disposed therein. Central pocket 84 is centrally disposed on side panel 14 above side gear pocket 27, for similar calls or other gear.

An elongated striker pocket 85 is disposed on the interior side of each respective over-the-shoulder panel 12 and 13 (the one on pad 12 is hidden from view). These provide flap 85 closed, protected receptacles for strikers to be used with slate calls, and helps keep them dry.

On the upper portion of each panel 12, 13 is a shell or choke tube pocket 87 covered by a snap 88 closed flap 87. Sleeves 90 are provided under flap 89 for holding extra shells or choke tubes. Under pocket 87 is another open top pocket 91 (FIG. 4) having an elastic gathered top 92 for receiving mouth calls or chalks used in conjunction with turkey calling.

It will be noted that the respective ends of side panel 14, beneath panels 12, 13 are curved at 94 to better accommodate a sitting turkey hunter.

A zipper 96 is disposed in each panel 12, 13 (that zipper in panel 13 hidden from view but the mirror image of zipper 96 in panel 12). Zipper 96 is curved complimentary to the curves 94 in side panel 14 to provide an opening into the area between inner and outer carrier layers defining panels 12, 13 and 14. Thus, just as in carrier 10, a storage area is defined in carrier 80 within panels 12, 13 and 14. Zipper 96, however, is provided in a curved configuration to more readily and fully access the storage area in the panels.

As in carrier 10, interior pockets with secure, releasable flaps are disposed on the interior surfaces of panel 14 just inside zippers 96 to provide easily accessible storage for frangible items, papers, licenses or other items where security or dryness is desired.

Carrier 80 is best worn over the left shoulder of a right-handed user and over the right shoulder of a left-handed user, to leave the appropriate shoulder free of obstruction for mounting a gun.

This particular combination of features and configurations provides a particularly useful carrier 80 for a turkey hunter, facilitates desirable gear load distribution and provides unique and ergonomically facilitated gear storage components.

Figure 6:
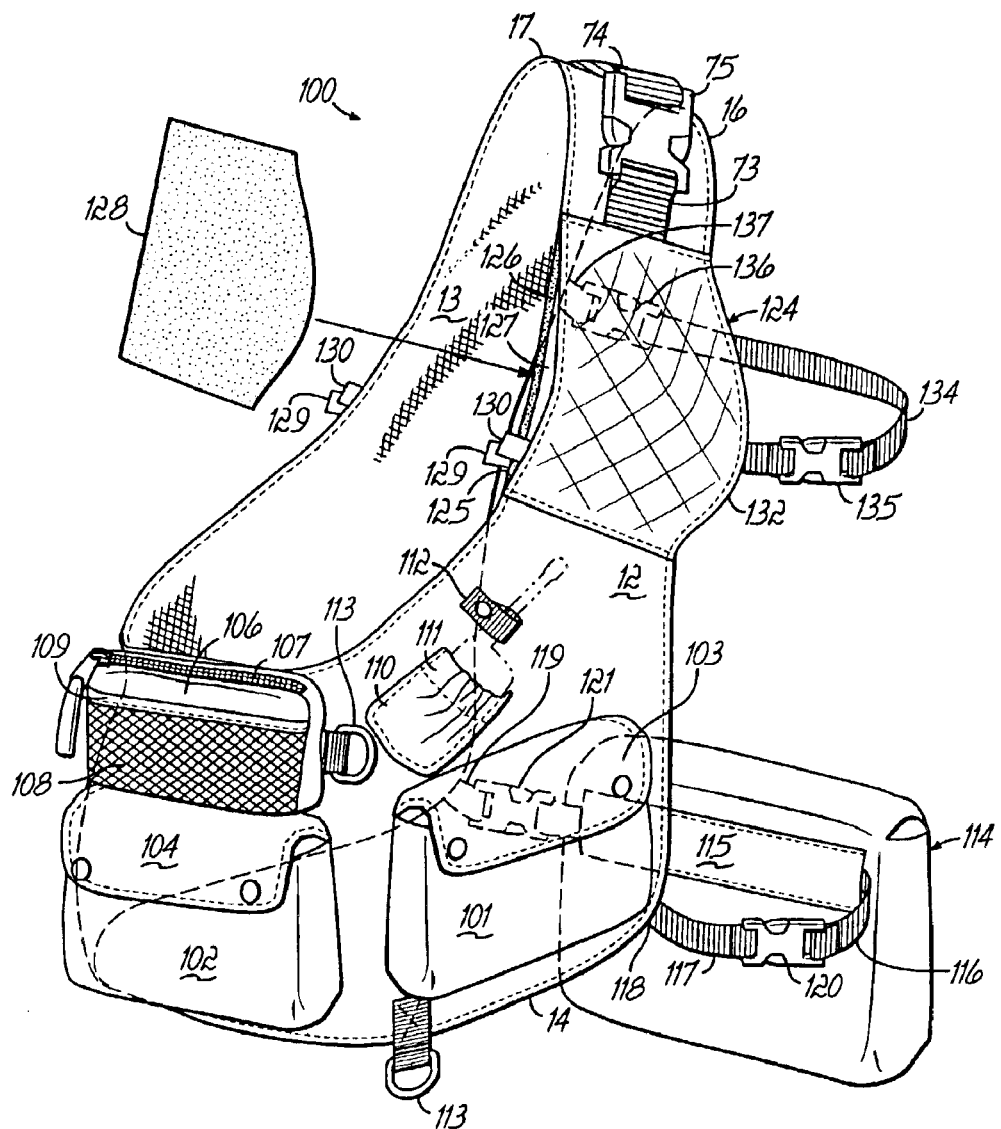
FIG. 6 is a perspective view of an upland hunter's gear carrier according to the invention.

A carrier 100 for upland game hunters is depicted in FIG. 6. This carrier 100 has some features similar to those in carriers 10 and 80 described above and those similar elements will be noted by the same numbers as in the other carriers. These include panels 12, 13, 14, except for the layered construction of the panels as will be described, and straps 73, 74 and buckle 75 (see FIG. 2B). Carrier 100 has similar over-the-shoulder cross-chest orientation and function as carriers 10 and 80.

Carrier 100 is provided with gear pockets 101, 102 as shown on panel 14, and another pocket on panel 14 which is the mirror image of pocket 101, and which is hidden in the view if FIG. 6. These three pockets each have a snap closed top flap 103, 104 (and a third not shown). Each of these pockets is preferably provided in their interior with elasticized shell loops for additional ammunition, for even load distribution.

Another pocket 106 is centrally disposed on panel 14 above pocket 102 and is closed by zipper 107. An accessory pocket is formed on the outside of pocket 106 by a preferably mesh layer 108, secured to pocket 106 by a hook and loop fastener 109.

"D"-rings 113 are provided on panel 14 in the positions shown for securing additional gear to the carrier 100. Similar "D"-rings (not shown) as a positioned in mirror image locations on panel 14 on the other side of pockets 102 and 106.

Another feature of carrier 100 is a radio transmitter pocket 110 having an elasticized top 111 for carrying a radio transmitter (shown in phantom) typically used with a radio receiver on a training collar for a hunting dog. Snap closed strap 112 is disposed on panel 14 proximate open end top 111 for securing the antenna of the transmitter as shown. A similar pocket 110 and strap 112 is positioned on the other side of panel 14 not shown in FIG. 6.

Carrier 100 includes a detachable flap covered game bag 114 having a rear belt sleeve 115 slidably capturing a belt 116. A strap 117 is secured to one end of panel 14 at 118. A strap 119 is secured to panel 14 at its other end. Quick release connectors or buckles 120, 121, or any suitable connects or secure belt 116 to straps 117, 119 respectively, with belt 116 being adjustable at its buckle ends. When secured, the belt 116, straps 117, 119 and panel 14 encircle the waist of a user, supporting bag 114.

It will be noted that bag 114 is disposed under the same shoulder of the user over which are disposed panels 12, 13, while the gear in pockets on panel 14 is supported under the other shoulder of the user, thereby balancing out loads in the game bag 1114 with gear in the various pockets.

Another feature of carrier 100 is a recoil pad 124 disposed proximate an upper end of panel 12. A like recoil pad in mirror image form and position is disposed proximate an tipper end of panel 13. The periphery of each recoil pad 124 is secured to its respective panel, such as by stitching, except at the edge 125 where the periphery of the pad and coextensive periphery of the panels are each respectively provided with an extended strip of a complimentary component of a hook and loop fastener 126. Thus, the peripheries at edge 125 can be pulled apart to expose a pocket 127 for receiving an accessory recoil pad 128 of any suitable recoil reducing material. Thus, it will be appreciated that this carrier is worn in a way such that the panels 12, 13 are disposed over the shoulder of a hunter onto which he normally mounts the stock of his shotgun. Tabs 129, 130 on the pads 124 and panels respectively are provided to aid in separating the pad 124 and its underlying panel 12 or 13 to insert or remove accessory pad 128.

It will be further appreciated that pads 124 have a projecting profile along edge 132 for wide coverage for recoil protection. Pad 124 is thus narrow as panels 12, 13 at its top and bottom where it is secured to the panels but wider in its middle along edge 132.

It will also be appreciated that panels 12, 13 and 14 can be made of any suitable material but are preferably of a single layer integral mesh material to allow circulation to the hunter. Accordingly, panels 12, 14 and 14 of carrier 100 are preferably formed of a single layer of material and do not incorporate an interior storage area as in carriers 10 and 80. The material of the panels and other components is also preferably of a visually attractive color, where suitable, such as hunter's orange, but could be of a camouflage pattern.

A belt 124 has a component of a two component buckle 135, 136 at each respective end. Other complimentary components are secured to respective panels by straps, such as strap 137 shown in dotted lines. In use, this straps across the chest of a user, helping to stabilize the carrier 100 through the activities of a user.

It will be further appreciated that in this embodiment, straps 73, 74 are not extended into any slot in panels 12, 13. Instead, the straps extend under recoil pad 124 where they are sewn or fastened to the respective panels 12, 13. The free ends of straps 73, 74 are tucked under the upper edge of recoil pad 124 in a break in a sew line securing pads 124 to panels 12, 13 to keep then out of the way.

Carrier 100 is clearly ambidextrous, useable equally as well by both right and left-handed upland game hunters, with even load bearing advantages and ergonomic access to particular gear.

Carrier 100 is best worn over the right shoulder by a right-handed hunter and over the left shoulder of a left-handed hunter so to properly position the recoil pad 124 for mounting a gun thereon.

Figure 7:
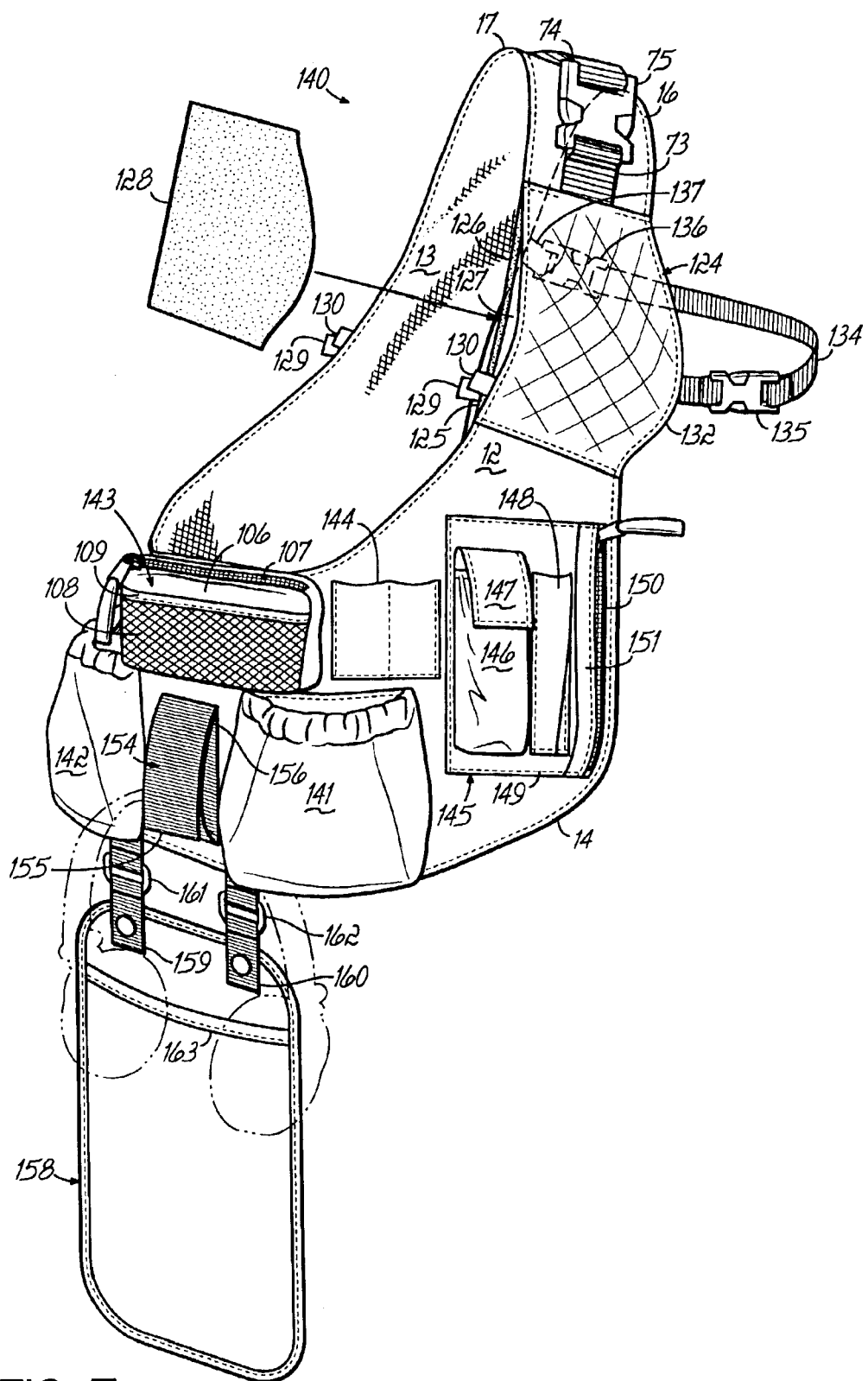
FIG. 7 is a perspective view of a gear carrier of a skeet shooter, trap shooter or sporting clays shooter according to the invention.

A carrier 140 particularly suited for users involved in shooting sports such as skeet, trap or sporting clays is depicted in FIG. 7. Components similar to those of carriers described above similar numbers and will not be described here. These include panels 12, 13 and 14, like carrier 100, straps 73, 74 and buckle 75, like carrier 100 (see FIG. 2B) and recoil pads 124, 128 and related configuration thereof like carrier 100.

Carrier 140 is provided with shell pockets 141, 142 on side panel 14 for carrying shotgun ammunition. These have open, elasticized tops permitting easy access to the shells. A gear pocket 143 is disposed centrally and at an upper portion of panel 14. Gear pocket 143 is closed by zipper 107 with an outer mesh pocket panel 108 closed to pocket 143 by hook and loop fasteners 109 similar to carrier 100.

Extra shell or elasticized choke tube carriers 144 are disposed on panel 14 in mirror image position proximate each side of pocket 143 (one being hidden from view in FIG. 7).

A multiple utility pocket 145 is disposed at each end of panel 14 below a respective over-the-shoulder panel 12, 13. Pocket 145 includes a cell phone pocket 146 with closure flap 147, pen sleeve 148 and outer pocket panel 149. An inner pocket panel (not shown) is coextensive with an outer pocket panel 149 to define a closable, secure pocket closed by zipper 150 disposed partially under protective flap 151. This allows the pocket 145 to be sewn to or applied to panel 14 which, like panel 14 of carrier 100, is a single layer mesh material for coolness as in carrier 100.

A strap 154 has two free ends 155, 156 each provided with a component of a hook and loop fastener so the ends can be detached to receive a hearing protector or each muff (shown in phantom) for protecting a shooter's ears when he is not in action. This strap 154 is located between pockets 141, 142 on panel 14.

A bag 158 is secured by snap connected straps 159, 160 to "D"-rings 161, 162 which in turn are secured to a lower edge of side panel 14 under pockets 141, 142. Bag 158 is preferably of mesh material and has an open top 163 for receiving empty shells as they are expended by the shooter.

Like the prior embodiment, the carrier 140 is best worn over the right shoulder of a right-handed shooter and over the left shoulder of a left-handed shooter to position the recoil pad in proper place for mounting the stock of a gun.

Like the other embodiments, even gear load is facilitated and elements of carrier 140 are configured for easy and ergonomic access.

Figure 8:
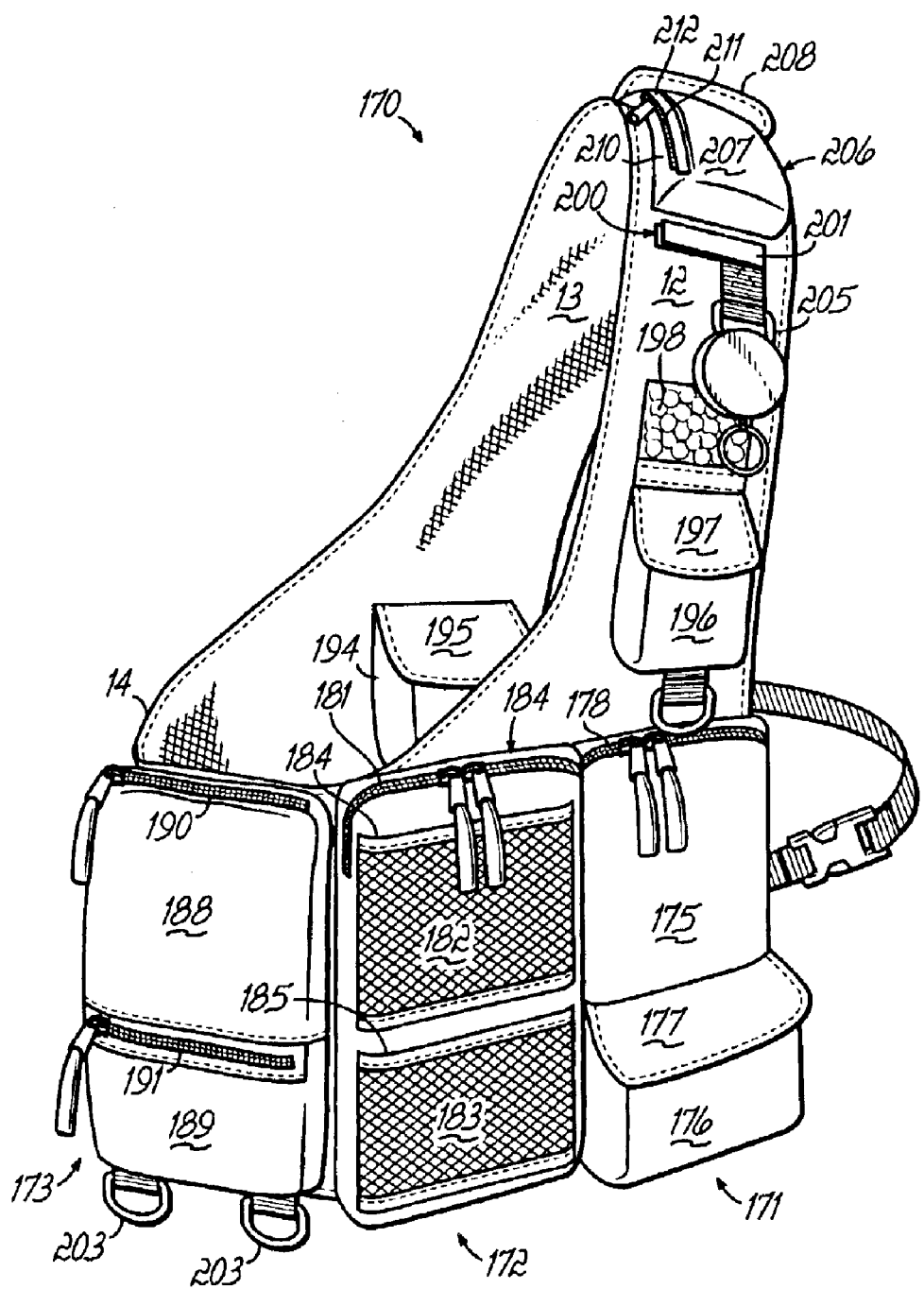
FIG. 8 is a perspective view of gear carrier for a fly fisherman accordingly, to the invention.

A gear carrier 170 particularly suited for a fly fisherman is depicted in FIG. 8. Carrier 180 includes single layer mesh over-the-shoulder panels 12, 13 and similar side panel 14.

Disposed about side panel 14 are a series of five vertically oriented pocket stations. Of these stations, only station 171, intermediate station 172 and central station 173 are shown. Two other pocket stations (not shown) corresponding to end station 171 and intermediate station 172 are the same as and are disposed in mirror image position to stations 171 and 172.

Vertically oriented end pocket station 171 and its twin end pocket station at the other end of panel 14 comprise a first elongated tackle box pocket 175 and a second, shorter, outer pocket 176 with a hook and loop fastener secured to flap cover 177.

Pocket 175 is elongated to accommodate an elongated tackle or fly containing boxes, and has a zipper closure 178.

Intermediate pocket station 172 and its twin on the other side of central pocket station 173 comprises an elongated tackle box pocket 180, closed with zipper 181. Two mesh panels 182, 183 are secured to the outer side of pocket 180 forming two shorter open top pockets 184, 185. These are particularly useful for such things as leader and tippet spools which are easily accessed by either right or left-handed users.

Central pocket station 173 comprises two pockets 188, 189 each closed with a respective zipper 190, 191.

It will be appreciated that each intermediate pocket station 172 and each end pocket station 171 comprises a vertically oriented pocket capable of accommodating an elongated tackle, fly or bait box in a vertical orientation. Many prior fishing vests use horizontal pockets for these items. The horizontal disposition of an elongated box is not in general conformity with the user's body. The vertical orientation of these items in carrier 170 allows carrier 170 to be more form-fitting to a rounded torso of a user than if the elongated boxes were disposed in horizontally-oriented pockets.

Two flap closed pockets 194 are disposed on the interior side at each end of side panel 14 (one hidden from view in FIG. 8). Each is closed by a hook and loop fastened flap 195. These pockets 194 are useful for more securely-held items.

A further gear pocket 196 is disposed respectively on each panel 12, 13. The pocket 196 on panel 13 is hidden from view in FIG. 8 but is a duplicate of pocket 196 on panel 12. Pocket 196 is closed by a hook and loop fastened flap 197.

A fleece-like fly pad 198 is mounted on panels 12, 13 just above pockets 196.

Above pads 198 is disposed, on each panel 12, 13, a fly rod holding strap 200 (that on panel 13 hidden from view in FIG. 8). One end portion of strap 200 is secured to panel 12, while the other end portion 201 is free. Each end portion of strap 200 is respectively fitted with a complimentary component of a hook and loop fastener so portion 201 can be pulled away from the other end portion, placed over a fly rod (not shown) and re-secured to the strap, thus holding the rod. The butt end of the rod is placed in a loop 203 secured to the lower edge of panel 14 beneath each intermediate pocket station 172. Thus, a rod can be secured allowing the user to have both hands free for line handling and gear handling.

A "D"-ring 205 is secured to each panel 12, 13 under strap 200 for carrying gear such as a rotatable retractor used to hold forceps, scissors, line tying tools, clippers or the like. A typical retractor is simulated in FIG. 8.

A still further gear pocket 206 is disposed on the outside of panel 12 which overlaps panel 13. Pocket 206 includes a pocket 207 useful for a cell phone or GPS unit and has a flap 208 secured by a hook and loop fastener.

A pocket 210 is disposed between panel 12 and pocket 206. Pocket 210 is closed by zipper 211, covered by flap 212 for securing items such as cash, licenses and the like.

Figure 8A:
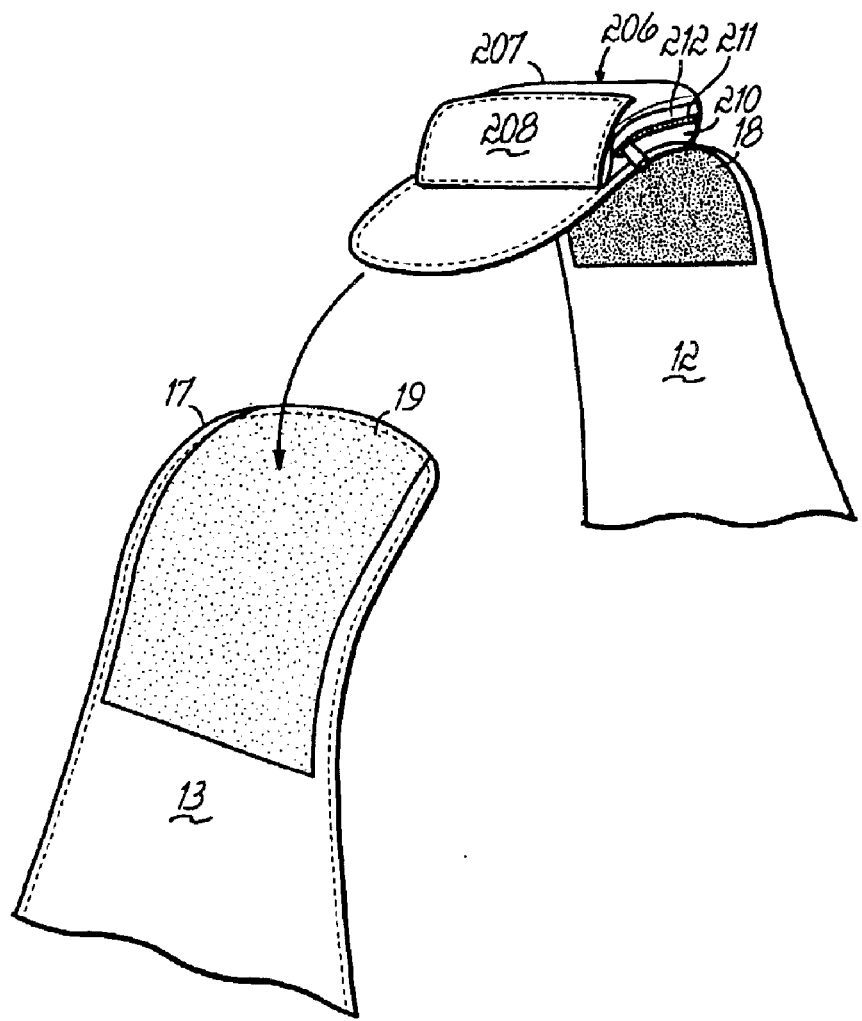
FIG. 8A is a perspective view showing the interconnection of panels on the carrier of FIG. 8.

In this embodiment, and as best shown in FIG. 8A, there are no straps 73, 74 or buckle 75, further reducing the weight of carrier 170. Panel 12 is fitted on its underside with a hook component of a hook and loop fastener while panel 13 is fitted on its outer side with a complimentary loop portion of such fastener. By this means, the panels 12, 13 are adjustable with respect to each other to fit a variety of sizes, shapes and clothing of a user. End 16 of panel 12 overlaps end 17 of panel 13.

Carrier 170 is ambidextrous and can be used by right or left-handed users, as can each of the above embodiments.

It will be further appreciated that each carrier described above can be made from any suitable fabric or material and of any suitable color or camouflage pattern adapted for a particular use.

Each carrier includes the single shoulder mounted, cross-chest configuration for evenly distributing the appropriate gear load, while at the same time having features and elements discovered to be ergonomically configured for easy access to the particular gear needs of the particular user of each carrier.

Each carrier is fully adjustable via panels 12, 13 and any waist or chest or game bag belts or straps to accommodate a variety of users, from sizes small (S) through double X large (XXL), and to accommodate a variety of clothing thicknesses worn under each carrier by a user.

It will be appreciated that the orientation of the respective pockets and 15, ear receptacles on each carrier are uniquely configured to its use, while at the same time rendering the ergonomics of each configuration useful to both right and left-handed users. The pocket configuration and orientation provides for even gear load distribution when the carrier of each embodiment is loaded with gear typical to the function of each.

Accordingly, further modifications and embodiments will become readily apparent to those of skill in the art without departing from the scope of their invention, and applicant intends to be bound only by the claims appended hereto.

What is claimed is:

1. An over-the-shoulder cross-chest gear carrier particularly suited for use by deer hunters and comprising:
   first and second over-the-shoulder panels defining an over-the-shoulder strap;
   a side panel;
   said first and second panels extending upwardly from said side panel;
   said first and second over-the-shoulder panels being adjustably secured to each other for adjustment of the length of said over-the-shoulder strap;
   a side gear pocket oriented in a central area of said side panel;
   a vertically-disposed flashlight pocket oriented on each side of said gear pocket; a seat pad;
   two flexible straps extending from proximate one edge of said seat pad and attached respectively to a lower area of said side panel proximate opposite sides of said side gear pocket;
   said seat pad hanging from said side panel when a user of said carrier is standing and said seat pad being capable of deployment under a seated user from his side; and
   a grunt tube pocket disposed over said side gear pocket; and
   a flexible tube holding sleeve extending upwardly from proximate said grunt tube pocket toward each of said over-the-shoulder panels.

2. A gear carrier as in claim 1 further including an elongated, vertically oriented deer grunt tube pocket disposed proximate each edge of said side panel and each elongated vertically oriented deer grunt tube pocket extending upwardly onto a respective one of said over-the-shoulder panels.

3. A gear carrier as in claim 1 further including attachment means for holding an end of said flexible tube proximate an upper end of each of said over-the-shoulder panels.

4. A gear carrier as in claim 1 including two open top pockets disposed in an outer side of the side gear pocket; and
   a flap covering an upper end of said side gear pocket and the open tops of said two open pockets thereon.

5. A gear carrier as in claim 1 including a side gear pocket flap operably disposed over said side gear pocket, a pocket in said flap, and a signal panel removably disposed in said pocket in said flap,
   said signal panel having first connector means cooperating with second connector means on said over-the-shoulder strap for holding said sigal panel in a position across the body of a user.

6. A gear carrier as in claim 5 wherein said signal panel comprises two signal panel sections, one signal panel section being deployed from said pocket in said flap in a direction toward one of said over-the-shoulder panels and another signal panel section being deployed from said pocket in said flap in a direction toward the other of said over-the-shoulder panels,
   said two signal panels being deployed over the chest and back of a user.

7. A gear carrier as in claim 6 wherein said signal panel is deployable from said pocket in said flap when said flap is closed over said side gear pocket and when said flap is not closed over said side gear pocket.

8. A over-the-shoulder cross-chest gear carrier particularly suited for use by deer hunters and comprising:
   first and second over-the-shoulder panels defining an over-the-shoulder strap;
   a side panel;
   said first and second panels extending upwardly from said side panel;
   said first and second over-the-shoulder panels being adjustably secured to each other for adjustment of the length of said over-the-shoulder strap;
   a grunt tube pocket disposed on said side panel, and a
   flexible tube directing sleeve for holding and directing a flexible tube extending from proximate said grunt tube pocket toward at least said over-the-shoulder strap.

9. A gear carrier as in claim 8 further including flexible tube holding means proximate an upper end of at least one of said over-the-shoulder panels.

10. A gear carrier as in claim 8 including two flexible tube directing sleeves, each sleeve having one open and operatively disposed respectively adjacent opposite ends of said grunt tube pocket, and each sleeve having another open proximate a respective over-the-shoulder panel.

11. A gear carrier as in claim 8 further including a side gear pocket in said side panel, a seat pad having flexible straps extending from an edge thereof; and
   said straps being respectively connectable proximate lower portions of said side panel proximate opposite sides of said side gear pocket.

12. An over-the-shoulder cross-chest gear carrier particularly suited for use by deer hunters and comprising:
   first and second over-the-shoulder panels defining an over-the-shoulder strap;

a side panel;

said first and second panels extending upwardly from said side panel;

said first and second over-the-shoulder panels being adjustably secured to each other for adjustment of the length of said over-the-shoulder strap;

and further including a side gear pocket on said side panel;

a seat pad; and flexible means securing said pad to lower portions of said side panel proximate opposite sides of said side gear pocket.

13. A gear carrier as in claim 12 further including closable, elongated openings proximate front edges of each of said over-the-shoulder panels providing access to an interior of said panels for access thereto for gear storage.

14. A gear carrier as in claim 13 further including a closable storage pocket disposed within each of said over-the-shoulder panels.

15. A gear carrier as in claim 12 wherein each over-the-shoulder panel has a free upper end;

a two component hook and loop fastener;

a loop component of said hook and loop fastener disposed on an outer surface proximate the free end of one of said over-the-shoulder panels;

a hook component of said hook and loop fastener being disposed on an interior surface proximate the free end of the other of said over-the-shoulder panels; and an adjustable strap operably connected between said over-the-shoulder panels and extending over said free ends of said over-the-shoulder panels to secure said over-the-shoulder panels together when said free ends overlap and are connected together by said hook and loop fasteners.

16. A gear carrier as in claim 12 further including an adjustable waist strap secured to lower edges of respective ends of said side panel and with said side panel, encircling the waist of a user wearing said gear carrier.

17. A gear carrier as in claim 12 further including an elongated grunt tube pocket disposed on respective ends of said side panel and each extending upwardly onto respective ones of said over-the-shoulder panels.

18. An over-the-shoulder cross-chest gear carrier particularly suited for use by a turkey hunter and comprising:

first and second over-the-shoulder panels defining an over-the-shoulder strap;

a side panel;

said first and second panels extending upwardly from said side panel;

said first and second over-the-shoulder panels being adjustably secured to each other for adjustment of the length of said over-the-shoulder strap;

an elongated box call pocket disposed on each of said over-the-shoulder panels for holding an elongated box call for turkey calling;

a gear pocket on said side panel; and means for attaching a seat pad to said side panel at two locations, one disposed proximate each side of said gear pocket at a lower edge of said side panel.

19. A gear carrier as in claim 18 including a shell receptacle disposed proximate an upper end of each over-the-shoulder panel;

a flap covering said shell receptacle; and a mouth call pocket disposed between each of said shell pockets and respective ones of said over-the-shoulder panels.

20. A gear carrier as in claim 18 further including three call pockets disposed on upper portions of said side panel, one of said three call pockets being disposed on said side panel above said gear pocket; and the other two of said three call pockets each being disposed on said side panel proximate a respective over-the-shoulder panel;

said other two pockets having access openings disposed at an angle to the horizontal when said gear carrier is worn by a user.

21. A gear carrier as in claim 18 further including a side gear pocket in said side panel, a seat pad having flexible straps extending from an edge thereof; and said straps being respectively connectable to said means for attaching a seat pad proximate lower edges of said side panel and proximate opposite sides of said side gear pocket.

22. A gear carrier as in claim 18 further including an adjustable torso strap secured to respective ends of said side panel and, with said side panel encircling the torso of a user wearing said gear carrier.

23. A gear carrier as in claim 18 including a side gear pocket flap operably disposed over said side gear pocket, a pocket in said flap, and a signal panel removably disposed in said pocket in said flap, said signal panel having first connector means cooperating with second connector means on said over-the-shoulder strap for holding said signal panel in a position across the body of a user.

24. A gear carrier as in claim 23 wherein said signal panel comprises two signal panel sections, one signal panel section being deployed from said pocket in said flap in a direction toward one of said over-the-shoulder panels and another signal panel section being deployed from said pocket in said flap in a direction toward the other of said over-the-shoulder panels, said two signal panels being deployed over the chest and back of user.

25. A gear carrier as in claim 24 wherein said signal panel is deployable from said pocket in said flap when said flap is closed over said side pocket and when said flap is not closed over said side gear pocket.

26. An over-the-shoulder cross-chest gear carrier particularly suited for use by a turkey hunter and comprising:

first and second over-the-shoulder panels defining an over-the-shoulder strap;

a side panel;

said first and second panels extending upwardly from said side panel;

said first and second over-the-shoulder panels being adjustably secured to each other for adjustment of the length of said over-the-shoulder strap;

a shell receptacle disposed proximate an upper end of each over-the-shoulder panel;

a flap covering said shell receptacle; and a mouth call pocket disposed between each shell receptacle and each of said over-the-shoulder panels respectively.

27. A gear carrier as in claim 26 wherein each mouth call pockets is an open top pocket.

28. An over-the-shoulder cross-chest gear carrier particularly suited for use by a turkey hunter and comprising:

first and second over-the-shoulder panels defining an over-the-shoulder strap;
a side panel;
said first and second panels extending upwardly from said side panel and having outer edges, each curving to meet a lower edge of said side panel;
said first and second over-the-shoulder panels being adjustably secured to each other for adjustment of the length of said over-the-shoulder strap;
and further including a side gear pocket on said side panel;
a seal pad;
flexible means releasably securing said seat pad to lower portions of said side panel proximate opposite sides of said side gear pocket;
elongated openings proximate front edges of each of said over-the-shoulder panels providing access to an interior of said panels for access thereto for gear storage, said elongated openings being curved with the outer edges of said first and second over-the-shoulder panels.

29. A gear carrier as in claim 28 further including a closable storage pocket disposed within each of said over-the-shoulder panels and accessible through said elongated, curved openings, respectively.

30. A gear carrier as in claim 28 wherein each over-the-shoulder panel has a free upper end;
a two component hook and loop fastener;
a loop component of said hook and loop fastener disposed on an outer surface proximate the free end of one of said over-the-shoulder panels;
a hook component of said hook and loop fastener being disposed on an interior surface proximate the free end of the other of said over-the-shoulder panels; and
an adjustable strap operably connected between said over-the-shoulder panels and extending over said free ends of said over-the-shoulder panels to secure said over-the-shoulder panels together when said free ends overlap and are connected together by said hook and loop fasteners.

31. A gear carrier as in claim 28 wherein said side panel includes means for securing a strap to opposite sides of said pad for securing said pad to one of a support or leg of a user wearing said gear carrier.

32. A gear carrier as in claim 28 further including an elongated striker pocket disposed on an inside surface of each of said over-the-shoulder panels.

33. An over-the-shoulder cross-chest gear carrier particularly suited for use by an upland game hunter and comprising:
first and second over-the-shoulder panels defining an over-the-shoulder strap;
a side panel;
said first and second panels extending upwardly from said side panel;
said first and second over-the-shoulder panels being adjustably secured to each other for adjustment of the length of said over-the-shoulder strap;
a game bag having means for attaching said bag to said carrier;
said carrier having complimentary means for attaching said game bag thereto;
said attaching means and said complimentary means securing said game bag in a position under the same shoulder of a user as said over-the-shoulder strap engages when said carrier is worn by a user.

34. A gear carrier as in claim 33 further including a transmitter proximate an upper portion of said side panel and proximate each of said over-the-shoulder panels respectively, said transmitter pocket being disposed on an angle with respect to the horizontal and having an open end; and
an antenna holding strap disposed on said carrier proximate said open top end.

35. A gear carrier as in claim 33 wherein said game bag is releasably attachable to said gear carrier.

36. A gear carrier as in claim 33 wherein said game bag, said attaching means, said complimentary means and said side panel define a waist belt surrounding the waist of a user when said gear carrier is worn.

37. A gear carrier as in claim 33 wherein each over-the-shoulder panel has a free upper end;
a two component hook and loop fastener;
a loop component of said hook and loop fastener disposed on an outer surface proximate the free end of one of said over-the-shoulder panels;
a hook component of said hook and loop fastener being disposed on an interior surface proximate the free end of the other of said over-the-shoulder panels; and
an adjustable strap operably connected between said over-the-shoulder panels and extending over said free ends of said over-the-shoulder panels to secure said over-the-shoulder panels together when said free ends overlap and are connected together by said hook and loop fasteners.

38. A gear carrier as in claim 33 and further including a recoil pad disposed proximate an upper end of each over-the-shoulder panel respectively,
each over-the-shoulder panel at said respective upper ends comprising an accessory recoil pad pocket having an opening along an edge of said recoil pad for selective insertion of an accessory recoil pad therein.

39. A gear carrier as in claim 38 wherein each said recoil pad has a top section having a width conforming to a width of an upper portion of said respective over-the-shoulder panel, a wider middle section and a narrower lower section with a width corresponding to a lower portion of said respective over-the-shoulder panel.

40. A gear carrier as in claim 33 having three gear pockets on said side panel, one gear pocket disposed on a lower central portion of said side panel and each of the other two gear pockets disposed on a lower portion of said side panel and no opposite sides of one gear pocket.

41. A gear pocket as in claim 40 further including a fourth gear pocket disposed on said side panel above said one gear pocket.

42. A gear carrier as in claim 40 wherein said one gear pocket rests on one side of a user when wearing said gear carrier while said game bag rests on an opposite side of the user.

43. An over-the-shoulder cross-chest gear carrier particularly suited for use by skeet, trap and sporting clay shooters and comprising:
first and second over-the-shoulder panels defining an over-the-shoulder strap;
a side panel;
said first and second panels extending upwardly from said side panel;
said first and second over-the-shoulder panels being adjustably secured to each other for adjustment of the length of said over-the-shoulder strap;

two shell pockets disposed on said side panel;
a gear pocket disposed on said side panel above said shell pockets; and
a recoil pad disposed on an upper portion of each of said over-the-shoulder panels.

44. A gear carrier as in claim 43 further including a cell phone pocket disposed on each of said side panels proximate a lower portion of each of said over-the-shoulder panels.

45. A gear carrier as in claim 43 further including a releasable strap on said side panel disposed between said two shell pockets for holding ear protectors of a user of said carrier.

46. A gear carrier as in claim 43 further including a receptacle for holding spent shells and means for releasably securing said receptacle to a lower portion of said side panel at a location proximate and under two shell pockets.

47. A gear carrier as in claim 43 further including receptacles on an upper portion of said side panel proximate each of said over-the-shoulder panels, said receptacles comprising elastic pockets for one of fresh shells or choke tubes.

48. A gear carrier as in claim 43 wherein each over-the-shoulder panel has a free upper end;
a two component hook and loop fastener;
a loop component of said hook and loop fastener disposed on an outer surface proximate the free end of one of said over-the-shoulder panels;
a hook component of said hook and loop fastener being disposed on an interior surface proximate the free end of the other of said over-the-shoulder panels; and
an adjustable strap operably connected between said over-the-shoulder panels and extending over said free ends of said over-the-shoulder panels to secure said over-the-shoulder panels together when said free ends overlap and are connected together by said hook and loop fasteners.

49. A gear carrier as in claim 43 further including an accessory recoil pad pocket defined in each of said over-the-shoulder panels under said recoil pad.

50. A gear carrier as in claim 49 including a closable opening into each said accessory recoil pad pocket respectively disposed along an edge of each said over-the-shoulder panels at said recoil pads.

51. A gear carrier as in claim 50 wherein each said recoil pad has a top section having a width conforming to a width of an upper portion of said respective over-the-shoulder panel, a wider middle section and a narrower lower section with a width corresponding to a lower portion of said respective over-the-shoulder panel.

52. An over-the-shoulder, cross-chest gear carrier particularly suited for use by a fly fisherman and comprising:
first and second over-the-shoulder panels defining an over-the-shoulder strap;
a side panel;
said first and second panels extending upwardly from said side panel;
said first and second over-the-shoulder panels being adjustably secured to each other for adjustment of the length of said over-the-shoulder strap;
a series of vertically oriented gear pockets disposed on said side panel;
another gear pocket disposed in a central portion of each of said over-the-shoulder panels; and
a further gear pocket disposed at an upper end of one of said over-the-shoulder panels overlapping an upper end of another over-the-shoulder panel.

53. A gear carrier as in claim 52 further comprising an adjustable waist strap having ends connected to respective ends of said side panel and, with said side panel, encircling the body of a user wearing said gear carrier.

54. A gear carrier as in claim 52 further including a pocket disposed on an interior surface of said side panel proximate each end thereof.

55. A gear carrier as in claim 52 wherein each over-the-shoulder panel has a free upper end;
a two component hook and loop fastener;
a loop component of said hook and loop fastener disposed on an outer surface proximate the free end of one of said over-the-shoulder panels; and
a hook component of said hook and loop fastener being disposed on an interior surface proximate the free end of the other of said over-the-shoulder panels on which said further gear pocket is disposed.

56. A gear carrier as in claim 52 further including a fly rod butt holder attached to a lower edge of said side panel at a location beneath each of said intermediate pocket stations.

57. A gear carrier as in claim 52 further including a closable pocket disposed between said further gear pocket and said over-the-shoulder panel on which said further gear pocket is disposed.

58. A gear carrier as in claim 52 wherein said series of vertically oriented pockets comprise five pocket stations on said side panel;
a central pocket station comprising two pockets, one located over the other;
two intermediate pocket stations on each side of said central pocket station and each intermediate pocket station comprising an elongated pocket with two outer pockets disposed thereon; and
two end pocket stations each respectively located between an intermediate pocket station and a respective end of said side panel;
said end pocket stations each comprising an elongated tackle box pocket with an outer pocket disposed thereon.

59. A gear carrier as in claim 58 wherein the two outer pockets on each respective elongated pocket of each intermediate pocket station each comprise an outer mesh side with an open top releasably secured to said respective elongated pocket.

60. A gear carrier as in claim 52 including a releasable fly rod holding strap disposed on each over-the-shoulder panel above said gear pocket and disposed in a central portion of each said over-the-shoulder panel.

61. A gear carrier as in claim 60 further including a "D"-ring attachment to each of said over-the-shoulder panels proximate said fly rod holding strap.

62. An over-the-shoulder, cross-chest gear carrier particularly suited for use by a fly fisherman and comprising:
first and second over-the-shoulder panels defining an over-the-shoulder strap;
a side panel;
said first and second panels extending upwardly from said side panel;
said first and second over-the-shoulder panels being adjustably secured to each other for adjustment of the length of said over-the-shoulder strap; and
a series of vertically-oriented pockets disposed on said side panel, including at least four vertically elongated pockets, each of a length to accommodate vertically a tackle box.

63. A gear carrier as in claim 62 further including shorter outer pockets disposed on each of said vertically-oriented pockets.

64. A gear carrier as in claim 62 wherein each over-the-shoulder panel has a free upper end;
   a two component hook and loop fastener;
   a loop component of said hook and loop fastener disposed on an outer surface proximate the free end of one of said over-the-shoulder panels;
   a hook component of said hook and loop fastener being disposed on an interior surface proximate the free end of the other of said over-the-shoulder panels; and
   said other of said free ends with said hook component overlapping and connecting to said one of said free ends to having said loop component.

65. An over-the-shoulder cross-chest gear carrier for hunters and comprising:
   first and second over-the-shoulder panels defining an over-the-shoulder strap;
   a side panel;
   said first and second panels extending upwardly from said side panel;
   a side gear pocket on said side panel;
   a seat pad; and
   flexible means releasably securing said seat pad to lower portions of said side panel proximate opposite sides of said gear pocket.

66. A gear carrier as in claim 65 wherein each over-the-shoulder panel has a free upper end;
   a two component hook and loop fastener;
   a loop component of said hook and loop fastener disposed on an outer surface proximate the free end of one of said over-the-shoulder panels;
   a hook component of said hook and loop fastener being disposed on an interior surface proximate the free end of the other of said over-the-shoulder panels; and
   an adjustable strap operably connected between said over-the-shoulder panels and extending over said free ends of said over-the-shoulder panels to secure said over-the-shoulder panels together when said free ends overlap and are connected together by said hook loop fasteners.

67. A gear carrier as in claim 65 further including an adjustable waist strap secured to lower edges of respective ends of said side panel and with said side panel, encircling the waist of a user wearing said gear carrier.

68. A gear carrier as in claim 65 further including an elongated closable opening proximate at least a front edge of a side panel and providing access to an interior of said panel for access thereto for fear storage.

69. A gear carrier as in claim 68, further including a closable storage pocket disposed within each of said over-the-shoulder panels.

* * * * *